(12) United States Patent
von Mayenburg

(10) Patent No.: US 6,286,868 B1
(45) Date of Patent: Sep. 11, 2001

(54) TRUCK RAIL FRAME

(75) Inventor: Michael von Mayenburg, Lake Oswego, OR (US)

(73) Assignee: Freightliner LLC, Portland, OR (US)

( * ) Notice: Subject to any disclaimer, the term of this patent is extended or adjusted under 35 U.S.C. 154(b) by 0 days.

(21) Appl. No.: 09/054,938

(22) Filed: Apr. 3, 1998

Related U.S. Application Data
(60) Provisional application No. 60/043,185, filed on Apr. 16, 1997.

(51) Int. Cl.⁷ .................................................. B62D 21/03
(52) U.S. Cl. ............................................. 280/800; 280/785
(58) Field of Search .................................. 280/781, 785, 280/786, 799, 800

(56) References Cited

U.S. PATENT DOCUMENTS

| | | |
|---|---|---|
| D. 25,412 | 4/1896 | Jones . |
| 813,175 | 2/1906 | Schaaf et al. . |
| 1,457,303 | 6/1923 | Higgins . |
| 1,848,895 * | 3/1932 | MacPherson .................... 280/800 |
| 2,052,535 * | 8/1936 | Sherman ........................ 280/106 |
| 2,065,378 | 12/1936 | Kling . |
| 2,127,618 * | 8/1938 | Riemenschneider ............ 228/151 |
| 2,165,074 * | 7/1939 | Sherman ........................ 280/106 |
| 3,580,611 * | 5/1971 | McNitt .......................... 280/433 |
| 3,698,224 | 10/1972 | Saytes . |
| 4,147,379 * | 4/1979 | Winslow ........................ 280/781 |
| 4,364,212 | 12/1982 | Pearson et al. . |
| 4,386,792 * | 6/1983 | Moore et al. .................. 280/781 |
| 4,468,946 | 9/1984 | Driear . |
| 4,881,355 | 11/1989 | Bosl et al. . |
| 5,005,864 * | 4/1991 | Chachere ....................... 280/800 |
| 5,163,225 | 11/1992 | Goleby . |
| 5,351,990 | 10/1994 | Thomas . |
| 5,454,620 | 10/1995 | Hill et al. . |
| 5,474,331 * | 12/1995 | Booher .......................... 280/789 |
| 5,507,522 | 4/1996 | Ritchie . |
| 5,520,407 | 5/1996 | Alatalo et al. . |
| 5,561,902 * | 10/1996 | Jacobs et al. .................. 29/897.2 |

\* cited by examiner

*Primary Examiner*—Paul N. Dickson
*Assistant Examiner*—Deanna Draper
(74) *Attorney, Agent, or Firm*—Klarquist Sparkman Campbell Leigh & Whinston LLP

(57) ABSTRACT

The present invention relates to vehicle frame rails, preferably of steel, which are formed with a web section which is not of a constant thickness. Preferably, the frame rail is formed by roll forming to produce the variable thickness, although other techniques, such as machining, could be used.

17 Claims, 1 Drawing Sheet

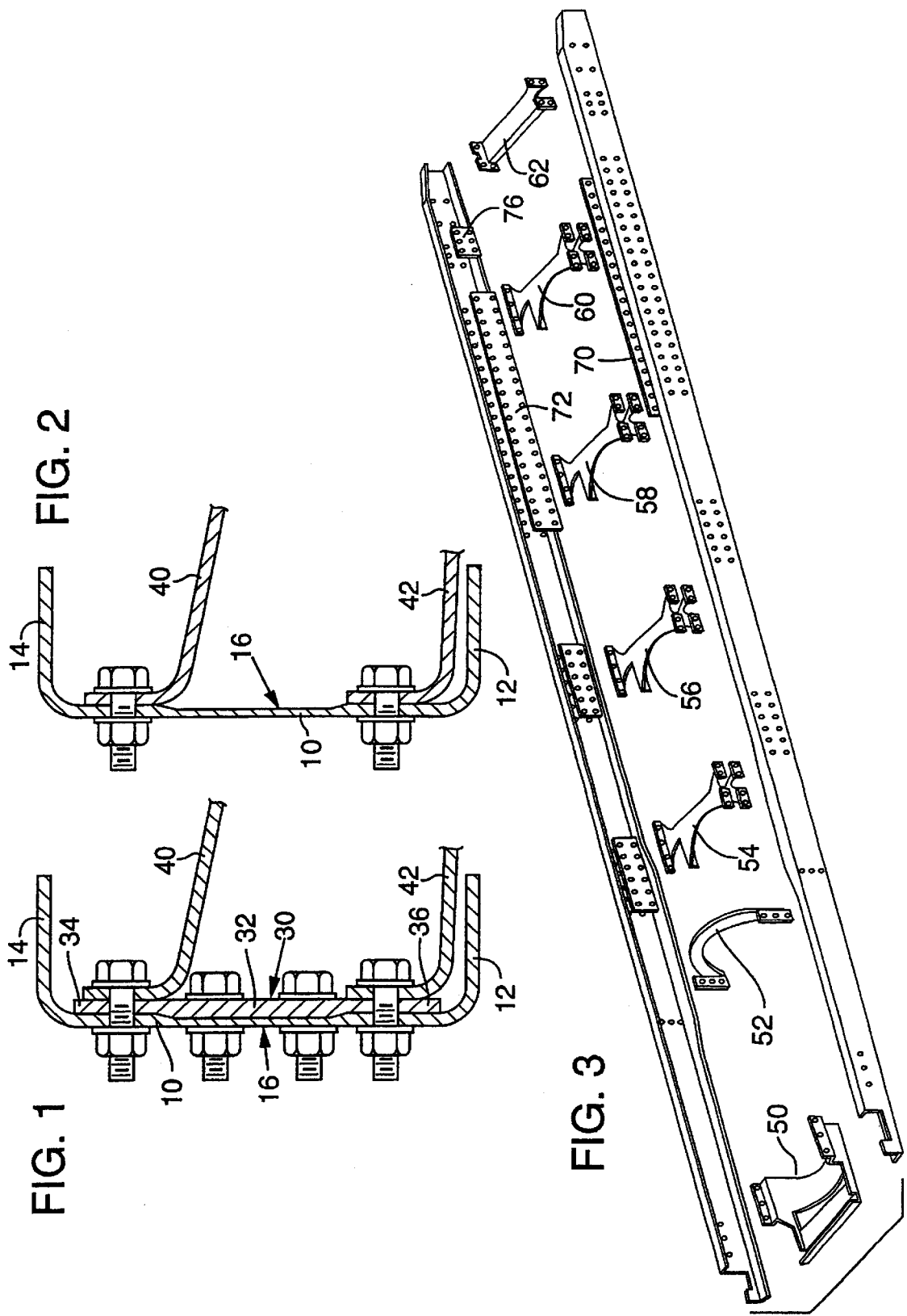

TRUCK RAIL FRAME

REFERENCE TO PRIOR APPLICATION

This application claims the benefit of U.S. Provisional Application Ser. No. 60/043,185 filed Apr. 16, 1997. This provisional application was entitled TRUCK RAIL FRAME.

BACKGROUND OF THE INVENTION

In trucks, it is common to provide a pair of parallel spaced-apart frame rails of C-shaped cross section which extend the length of the truck. In one prior art approach, the frame rails are of steel of a C-shaped cross section with a vertical web portion and upper and lower flange portions of a constant thickness, with the thickness of the flanges being equal to the thickness of the webs. Aluminum frames have also been manufactured with frame rails of a C-shaped cross section with a web portion of a constant thickness and web flanges which are of a constant thickness but of a thickness which differs (e.g. is thicker than) from the thickness of the web portion.

SUMMARY OF THE INVENTION

The present invention relates to vehicle frame rails, preferably of steel, which are formed with a web section which is not of a constant thickness. Preferably, the frame rail is formed by roll forming to produce the variable thickness, although other techniques, such as machining, could be used.

BRIEF DESCRIPTION OF THE DRAWINGS

FIG. 1 is a vertical sectional view through a frame rail of the present invention with a reinforcement coupled thereto.

FIG. 2 is a vertical sectional view through a frame rail of the present invention at a location without a reinforcement.

FIG. 3 is a perspective view of a truck frame with first and second parallel spaced-apart frame rails with reinforcement elements and cross frame rail supports.

DETAILED DESCRIPTION OF PREFERRED EMBODIMENTS

With reference to FIG. 1, a frame rail in accordance with the present invention has an upright web section 10 and upper and lower flange portions 12, 14. As can be seen in FIG. 1, a central portion 16 of the web 10 is thinned, or of a reduced thickness. This central portion of reduced thickness may extend the full length of the frame rails. For example, the thickness of the thinned area of the web 10 can be 4.0 mm, while the thickness of flanges 12 and 14, and the unthinned areas of web 10 are 7.1 mm. The height of the rail from the underside of the lower flange 12 to the top surface of the upper flange 14 may be 255.6 mm. In comparison to a frame rail of steel having a web and flanges of 7.1 mm in thickness throughout, a pair of the present frame rails of steel weighs 116 pounds less. A pair of steel frame rails and aluminum reinforcements, as described below, provide a net weight loss of about 86 pounds over a frame rail construction with uniform web and flange thicknesses. A low alloy heat-treatable steel is preferred, such as now used in conventional rails for commercially available trucks, such as from Freightliner Corporation.

As shown in FIG. 1, at critical areas of stress along the frame rail, a reinforcing element 30 is preferably installed. To save weight, the reinforcement may be of aluminum or of another material which is lighter than the material used for the frame rails. The reinforcement may be die formed. The reinforcement has a thickened central portion 32 which is configured to nest within the thinned portion of the web 10. In addition, upper and lower extension portions of the reinforcement 30 are of a reduced thickness. Reinforcing cross braces, such as a brace having arms 40, 42, are bolted or otherwise fastened by fasteners to the reinforcement and frame rails. Some of these fasteners extend through the respective bracket arm, thinned portion of the reinforcement, and thickened portion of the web. Other bolts extend through the thickened portion of the reinforcement and the thinned portion of the web. Typically these bolts are centered on two inch vertical and horizontal spacing. Locknuts may be used to secure the bolts in place.

FIG. 3 illustrates a pair of frame rails in accordance with the present invention with various transverse cross braces as shown, including an engine cradle 50 that supports the front end of the engine; a rear engine support 52; a rear of transmission support 54; a back-of-cab/fuel tank support 56; a front of rear tandem suspension support 58; a centerline of rear tandem suspension support 60; and an end-of-frame cross piece 62.

Since the tandem suspension location is an area of high stress, elongated reinforcement sections 70, 72 are provided respectively along the frame rails at this location. Although variable, in one form of the invention, these particular sections are approximately six feet long. The front and rear tandem suspension cross pieces 58, 60 are connected to the reinforcements and frame rails as shown in FIG. 1. At other locations of lower stress, such as in the region of the rear engine support 52, the cross pieces are fastened as shown in FIG. 2, as no reinforcement is required. In the illustrated embodiment, a reinforcement section 76 of shorter length (e.g. two feet) is provided at the location of the end frame cross piece. Also, short reinforcement sections may be provided at cross pieces or supports 54, 56.

In the preferred manufacturing approach, elongated sheet stock steel is separated or slit into a strip having the desired width. This width is the sum of the widths of the top flange, web and bottom flange, less an allowance for the expansion of the width during roll forming. Each strip is then subjected to roll forming to produce a thinned area between the edges of the strip and in the area which will be formed into the central web. The strip is then bent in a die to form the upper and lower flanges. The resulting rail is then heat treated. This process, except for the rolling step to produce the thinned actual web is expected to be conventional.

Although more expensive and time consuming to manufacture, it is also possible to achieve the results of the present invention without the reinforcements, by machining or otherwise removing material from the frame rails at selected locations of lower stress. For example, in the region of the tandem suspension, the frame rail could be left full thickness, whereas in other areas along the frame rail where reinforcements would not be required, the thickness of the frame rail could be reduced.

It should be understood that the present invention may be modified in arrangement and detail without departing from its principles. We claim as our invention all such modifications as fall within the scope of the following claims.

I claim:

1. A truck frame for a truck, the truck frame comprising first and second parallel spaced-apart elongated side frame rails which each extend in a lengthwise direction of the truck, each frame rail including a central web portion with a length and first and second flange portions, the web portion having at least selected areas of a reduced thickness in comparison to the thickness of the flange portions, the selected areas of reduced thickness extending along at least a substantial portion of the length of the web, and plural elongated reinforcements mounted to the frame rails at selected locations of the web of reduced thickness.

2. A truck frame according to claim 1 in which the frame rails are of steel and the reinforcements are of aluminum or another material which is lighter than steel.

3. A truck frame according to claim 1 including at least two cross pieces respectively extending between the webs of the respective rails and also extending between and being connected to respective pairs of reinforcements.

4. A truck frame according to claim 1 in which the web has opposed surfaces and the reinforcements are shaped to nest within the selected areas of reduced thickness and wherein at least some of the selected areas of reduced thickness are recessed into the web from only one of the opposed surfaces of the web.

5. A truck frame according to claim 1 wherein the web portion has opposed surfaces and the selected areas of reduced thickness are recessed into only one of the opposed surfaces.

6. A truck frame according to claim 1 in which the frame rail includes at least one straight section along which a selected area of reduced thickness is positioned.

7. A method of manufacturing a truck frame rail comprising:
   sitting steel sheet stock to form elongated strips having side edges;
   rolling the strips to form an elongated thinned region in the strips between the side edges; and
   bending the strips to form a rail with upper and lower flange portions and a central web portion, the thinned region being positioned in the web portion.

8. A truck frame comprising first and second spaced apart frame rails, each having a web portion and upper and lower flange portions, the frame rails each having a respective tandem support section positioned to support a tandem suspension of a truck, the web portion being thicker at the tandem support section than at selected other locations along the frame rail.

9. A truck frame comprising first and second parallel spaced-apart elongated one piece frame rails, each frame rail including a central web portion having a length and first and second flange portions, the web portion having at least selected elongated areas extending along at least a substantial portion of the length of the web of a reduced thickness in comparison to the thickness of the flange portions, and plural elongated reinforcements mounted to the frame rails at selected locations of the web of reduced thickness.

10. A truck frame according to claim 9 in which the frame rails are of steel and the reinforcements are of aluminum or another material which is lighter than steel.

11. A truck frame according to claim 9 including cross pieces transversely extending between the rails and between respective pairs of reinforcements.

12. A truck frame according to claim 9 in which the reinforcements are shaped to nest within the selected areas of reduced thickness.

13. A truck frame according to claim 9 in which the spacing between the first and second flange portions is uniform and in which the thickness of the first and second flange portions is uniform along their entire length.

14. A truck frame rail comprising a one piece elongated element having first and second parallel flange portions of a first thickness and a web portion extending between the flange portions, the spacing between the flange portions being uniform, and wherein the web portion has selected areas of a thickness which is less than the first thickness, the selected areas being elongated and extending at least along a substantial portion of the length of the truck frame rail.

15. A truck frame rail according to claim 14 wherein the selected areas of a thickness which is less than the first thickness extend along the full length of the truck frame rail.

16. A truck frame for a truck, the truck frame comprising first and second parallel spaced-apart elongated side frame rails which each extend in a lengthwise direction of the truck, each frame rail including a central web portion and first and second flange portions, the web portion having at least selected areas of a reduced thickness in comparison to the thickness of the flange portions, and plural elongated reinforcements mounted to the frame rails at selected locations of the web of reduced thickness;
   the truck frame comprising a front of rear tandem suspension support coupled to the first frame rail and to the second frame rail;
   the truck frame comprising a centerline of rear tandem suspension support coupled to the first frame rail and to the second frame rail and spaced rearwardly of the front rear tandem suspension support; and
   at least one of the elongated reinforcements being located at each location where the front of rear tandem suspension support and the centerline of rear tandem suspension support are coupled to the respective frame rails.

17. A truck frame rail according to claim 16 comprising a first one-piece elongated reinforcement positioned to extend along the first frame rail and reinforce the locations where each of the front of rear tandem suspension support and centerline of rear tandem suspension support are coupled to the first frame rail and a second one-piece elongated reinforcement positioned to extend along the second frame rail and reinforce the locations where each of the front of rear tandem suspension support and centerline of rear tandem suspension support engage the second frame rail.

* * * * *

UNITED STATES PATENT AND TRADEMARK OFFICE
CERTIFICATE OF CORRECTION

PATENT NO. : 6,286,868 B1
DATED : September 11, 2001
INVENTOR(S) : Michael von Mayenburg It is certified that error appears in the above-identified patent and that said Letters Patent is hereby corrected as shown below:

<u>Column 3,</u>
Line 30, the word "sitting" should read -- slitting --

Signed and Sealed this

Twenty-eighth Day of May, 2002

Attest:

JAMES E. ROGAN
Attesting Officer
Director of the United States Patent and Trademark Office